US011591670B2

(12) United States Patent
Tran et al.

(10) Patent No.: US 11,591,670 B2
(45) Date of Patent: Feb. 28, 2023

(54) RECYCLING LI-ION BATTERIES USING GREEN CHEMICALS AND PROCESSES

(71) Applicant: William Marsh Rice University, Houston, TX (US)

(72) Inventors: Mai K. Tran, Houston, TX (US); Marco-Tulio F. Rodrigues, Houston, TX (US); Ganguli Babu, Houston, TX (US); Hemtej Gullapalli, Houston, TX (US); Pulickel M. Ajayan, Houston, TX (US)

(73) Assignee: William Marsh Rice University, Houston, TX (US)

( * ) Notice: Subject to any disclaimer, the term of this patent is extended or adjusted under 35 U.S.C. 154(b) by 252 days.

(21) Appl. No.: 16/909,560

(22) Filed: Jun. 23, 2020

(65) Prior Publication Data

US 2020/0399737 A1   Dec. 24, 2020

Related U.S. Application Data (60) Provisional application No. 62/865,625, filed on Jun. 24, 2019.

(51) Int. Cl.
| | |
|---|---|
| *C22B 26/00* | (2006.01) |
| *C22B 26/12* | (2006.01) |
| *H01M 10/54* | (2006.01) |
| *C22B 7/00* | (2006.01) |

(52) U.S. Cl.
CPC .............. *C22B 26/12* (2013.01); *C22B 7/007* (2013.01); *H01M 10/54* (2013.01)

(58) Field of Classification Search
CPC ......... H01M 10/54; C22B 26/12; C22B 7/007
See application file for complete search history.

(56) References Cited

U.S. PATENT DOCUMENTS

| | | |
|---|---|---|
| 2004/0028585 A1 | 2/2004 | Cardarelli et al. |
| 2010/0203366 A1 | 8/2010 | Sloop |
| 2018/0237314 A1* | 8/2018 | Xing ..................... H01M 4/505 |

FOREIGN PATENT DOCUMENTS

| | | |
|---|---|---|
| CN | 1819326 A | 8/2006 |
| CN | 106848475 A | 6/2017 |
| EP | 3087208 B1 | 10/2017 |
| JP | 2007122885 A | 5/2007 |
| WO | 2007147222 A2 | 12/2007 |

\* cited by examiner

*Primary Examiner* — Steven J Bos
(74) *Attorney, Agent, or Firm* — Osha Bergman Watanabe & Burton LLP (57) ABSTRACT

A process for extracting, recovering and recycling metals and materials from spent lithium ion batteries (LIB) that comprises the contacting battery waste products with a deep eutectic solvent, and leaching the metal from the battery waste product and extracting the metal into the deep eutectic solvent with heat and agitation. After the leaching and extracting, the process further includes recovering the dissolved metals ions from the deep eutectic solvent solution, followed by a step of regeneration of cathode materials.

14 Claims, 7 Drawing Sheets

| FIG. 9A | FIG. 9B | FIG. 9C | FIG. 9D |

RECYCLING LI-ION BATTERIES USING GREEN CHEMICALS AND PROCESSES

STATEMENT REGARDING FEDERALLY SPONSORED RESEARCH OR DEVELOPMENT

This material is based upon work supported by the National Science Foundation Graduate Research Fellowship Program under Grant No. 1842494. Any opinions, findings, and conclusions or recommendations expressed in this material are those of the author(s) and do not necessarily reflect the views of the National Science Foundation.

BACKGROUND

With the ever-increasing demand for energy being fulfilled by rechargeable lithium-ion batteries (LIB), the accelerated production of these devices will soon translate into massive amounts of waste. The development of LIB-specific recycling methods can minimize the impact of this waste and also alleviate constraints on the supply chain of battery manufacturers. Cobalt, for example, is a strategic material that typically constitutes up to 15 wt % of LIB cathodes, is relatively expensive, and is mainly sourced from potentially corrupted conflict-zones in what are not always reliable areas in the world. Cobalt in large accumulated quantities is also of health and environmental concerns. Although the efficient recovery of raw materials from spent batteries will be economically and environmentally advantageous, existing technologies still face practical problems.

Most of the recoverable value in spent batteries is in the cathode. Common approaches to extract the metal contained in the active lithium oxides are either based on pyrometallurgy, hydrometallurgy, biometallurgy, mechanical methods or some combination of the four. Among these, pyrometallurgy is the most prevalent in industry despite the high energetic cost from the extreme temperatures (1400° C. or higher), and rampant off-gassing of harmful fumes, which require drastic safety precautions as well as scrubbing infrastructure to reduce subsequent pollution. Furthermore, the resulting mixed slag makes it nearly impossible to fully recover all the metals, such as lithium, using this method alone. Hydrometallurgy is one of the most viable options, due to its high metal leaching rate and purity of the recovered product. Unfortunately, even this technique usually involves caustic reagents.

SUMMARY

In one aspect, embodiments disclosed herein relate to an alternative and highly efficient concept to extract value from Li-ion battery waste using a deep eutectic solvent (DES). While this particular DES is also a "green solvent", it can act as both an effective leaching and reducing agent, eliminating the need for supporting chemicals and processes to achieve metal extraction.

In one aspect, embodiments disclosed herein generally relate to a process for extracting, recovering and recycling metals and materials from spent (LIB) comprising the steps of contacting a battery waste product comprising metals and/or metal alloys with a deep eutectic solvent, wherein the deep eutectic solvent comprises a hydrogen bond acceptor compound and a hydrogen bond donor compound and leaching the metal from the battery waste product and extracting the metal into the deep eutectic solvent with heat and agitation. The process further includes recovering the dissolved metals ions from the deep eutectic solvent solution and regeneration of cathode materials from the recovered dissolved metal ions for a new energy application.

In another aspect, embodiments disclosed herein generally relate to a system for recovering and recycling metals from spent lithium ion batteries (LIB) wherein the system comprises a vessel for contacting a battery waste product comprising metals and/or metal alloys with a deep eutectic solvent, wherein the deep eutectic solvent comprises a hydrogen bond acceptor compound and a hydrogen bond donor compound, thereby leaching the metal from the battery waste product and extracting the metal into the deep eutectic solvent. The system further comprises a vessel for precipitating the dissolved metals ions from the deep eutectic solvent solution, and a vessel for electrodeposition of the dissolved metals ions from the deep eutectic solvent solution.

In yet another aspect, embodiments disclosed herein generally relate to a process for extracting, recovering and recycling metals and materials from spent lithium ion batteries (LIB). The process may include contacting battery waste products such as metals and/or metal alloys with a deep eutectic solvent. The deep eutectic solvent may include choline chloride and ethylene glycol in a molar ratio ranging from 1:1 to 1:3 and the DES may be mixed with the battery waste product in a ratio ranging from 5 g/0.001 g to 5 g/0.1 g. The process may include steps of leaching the metal from the battery waste product and extracting the metal into the deep eutectic solvent. The leaching and extracting may be conducted for 8 to 72 hr at a temperature ranging from 25° C. to 220° C. The process may further include steps of recovering the dissolved metals ions from the deep eutectic solvent solution, and regeneration of cathode materials from the recovered dissolved metal ions for new energy application.

Other aspects and advantages of one or more embodiments disclosed herein will be apparent from the following description and the appended claims.

BRIEF DESCRIPTION OF DRAWINGS

FIGS. 3A-3B show (FIG. 3A) cobalt concentration versus temperature.

FIGS. 6A-6B show (FIG. 6A) an FTIR spectra indicating the presence of carbonate groups before calcining (blue curve). The corresponding band vanishes on calcination (red curve), which prompts the conversion of the powder into $Co_3O_4$.

FIGS. 7A-7B show that (FIG. 7A) Co 2p3/2 XPS indicates fitted peaks correlating to divalent cobalt, and the inset shows the spin-orbit coupling between the 2p1/2 and 2p3/2 bands that suggest the presence of trace metal cobalt.

FIGS. 8A-8B show an (FIG. 8A) XRD spectra of the calcined powder, exhibiting crystalline peaks matching those of the cubic cobalt oxide spinel JCPDS 42-1467.

FIGS. 9A-9D show the color change from clear to green after the DES (clear) solution leaches cobalt from the added LCO. FIG. 9A is pure DES solution and FIG. 9B is the DES solution with LCO dissolved in it. The $Co^{2+}$ ions were then electrodeposited onto a substrate, allowing the remaining DES to be recovered (FIG. 9C). LCO was then added to the recovered DES for another cycle of electrodeposition and resulted in a similar color change and leaching efficiency to the first cycle (9D).

FIGS. 11A-11B show (FIG. 11A) a photograph of dismantled spent LCO/Li half-cell containing (i) cathode powder/conductive carbon coated onto aluminum foil bound by PVDF binder, (ii) stainless steel (SS) cell bottom, (iii) quartz separator, (iv) SS spacer, (v) SS cell lid, and (vi) SS spring.

FIGS. 12A-12B show (FIG. 12A) photographs of the color change during $LiN_{1/3}Mn_{1/3}Co1/3O_2$ (NMC) cathode powder dissolution in the deep eutectic solvent. FIG. 12A shows vials containing NMC leachate shows a dark green color with blue hues (presumably from cobalt) immediately after removal from 180° C. heat, (FIG. 12B) the same vial shows a yellow-brown color after allowing to cool to room temperature, as the $Ni^{2+}$ likely forms the tetrachloronickelate (II) ion ($[NiCl_4]^{2-}$).

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In the following description, any component described with regard to a figure, in various embodiments of the present disclosure, may be equivalent to one or more like-named components described with regard to any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements, if an ordering exists.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

One or more embodiments disclosed herein relate to processes and systems for extracting, recovering and recycling metals and materials from spent lithium ion batteries (LIB). In general, one or more embodiments are directed to a special class of ionic liquids known as deep eutectic solvents (DES) that are composed of a range of hydrogen bond donors typically made of carboxylic acids, amides, or alcohols mixed with hydrogen bond acceptors, such as quaternary ammonium salts.

In one aspect, embodiments disclosed herein relate to an alternative and highly efficient concept to extract value from Li-ion battery waste using a DES. While this particular DES is also a "green solvent", it can act as both an effective leaching and reducing agent, eliminating the need for supporting chemicals and processes to achieve metal extraction.

One or more embodiments of the present disclosure relate to a system for recovering and recycling metals from spent lithium ion batteries (LIB) including a vessel for contacting battery waste product that may include metals and/or metal alloys with a deep eutectic solvent. Deep eutectic solvents may include a mixture of a hydrogen bond acceptor compound and a hydrogen bond donor compound that may be used to leach the metal from the battery waste product by extracting the metal into the deep eutectic solvent with heat and agitation, heat and pressure, or combinations thereof. Systems of one or more embodiments may also include a vessel for precipitating or electrodepositing the dissolved metals ions from the deep eutectic solvent solution. In one or more embodiments, this system may be operated in a batch mode, continuous mode, or a semi-continuous mode.

One or more embodiments may include equipment for separating the leachate from the battery waste, and equipment to separate the precipitated metals from the DES. Battery waste product may include components such as a current collector, graphite and separator to be recovered from the battery waste.

In one or more embodiments, processes for extracting, recovering and recycling metals and materials from spent LIBs may include a hydrogen bond donor, such as ethylene glycol, that can form a uniform liquid at room temperature with quaternary ammonium salt choline chloride, such as vitamin B4.

In the processes of one or more embodiments, the uniform liquid may then be exposed to spent battery parts where the solvent can dissolve the metal components of the spent LIB. This process can be accompanied not only by heating, but also by mechanical agitation through stirring, sonication, ball-milling (also at cryogenic temperatures), pressure-assisted solvothermal methods, microwaves, and combinations of these methods. The metal ions may be leached from the spent battery component and recovered as a metal oxide through one or more techniques of precipitation, electrodeposition, and solvent (liquid-liquid) extraction. The recovered metal ions of one or more embodiments may subsequently be used in a new energy application. The metal ions can alternatively be directly repurposed into a new battery material through the addition of lithium salts to form lithiated metal oxides. In one or more embodiments, methods may include a calcination step of the precipitated or electrodeposited metal ions to produce metal oxides of the separated metal ions.

In one or more embodiments, after recovering these metal ions and battery components from the DES solution, the remaining DES solution can potentially be reused as such or repurposed by adding more hydrogen bond donors and/or acceptors for further cycling of the process.

Deep eutectic solvents are a class of compounds that present an unusually high capability of dissolving metal oxides. These solvents are eutectic mixtures of hydrogen bond donors and hydrogen bond acceptors that may be cheaply obtained, easily prepared, and prepared from relatively nontoxic and biodegradable compounds. In one or more embodiments, an advantage of using DESs for the dissolution and/or leaching of metals is that there is no additional need for an extra step involving a reducing agent and/or expensive solvent extractants. Such extractants are commonly added to many conventional hydrometallurgical procedures. Here, these virtues are extended to the scope of lithium ion batteries (LIBs), for the use of these sustainable solvents as vehicles to enable the recycling of spent Li-ion batteries.

Figure 1:
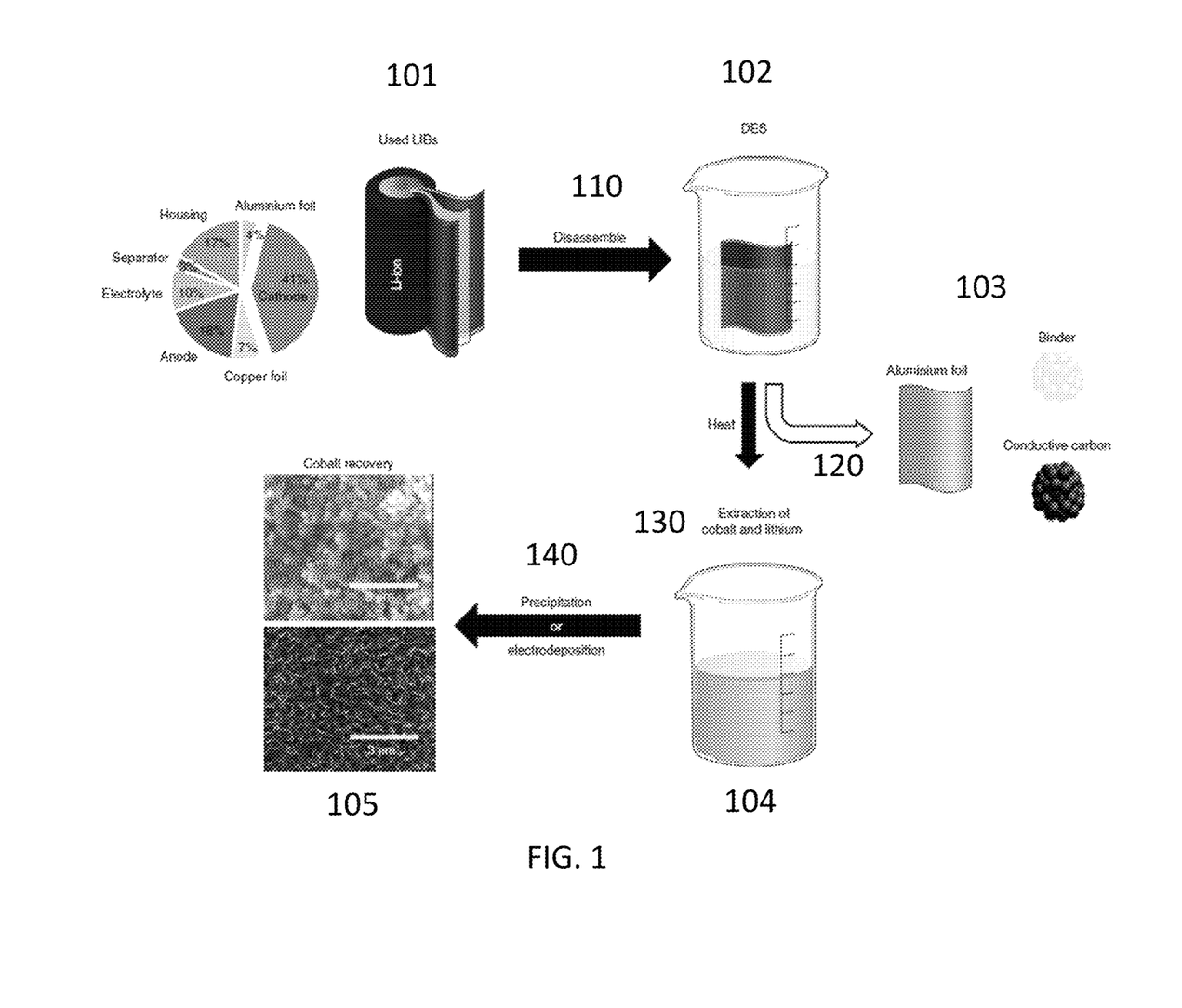
FIG. 1 is a schematic overview of the battery recycling process in accordance with one or more embodiments.

A proposed recycling scheme in accordance with one or more embodiments of the present disclosure is depicted in FIG. 1. In one or more embodiments, the general recycling process begins with the dismantling 110 of the Li-ion battery 101 and the insertion of a cathode of the Li-ion battery into a vessel containing a deep eutectic solvent 102. After heating and stirring, the leachate 104 can be filtered 120, and the foil, binder, and residual conductive carbon 103 can be recovered separately from the extraction 130 of metal ions from the deep eutectic solvent 102. With precipitation or electrodeposition 140, the dissolved metal ions such as lithium or cobalt can be recovered in a vessel for precipitating and/or electrodeposition 105 of the dissolved metal ions. The precipitated and/or electrodeposited metal ions obtained may be calcined to form metal oxides that may be used or repurposed in other energy applications.

In one or more embodiments of the present disclosure, a deep eutectic solvent is made by mixing hydrogen bond donor(s) and hydrogen bond acceptor(s) in specific molar amounts and forming a homogenous liquid. In one or more embodiments, the hydrogen bond donor may be selected from an alcohol, an amine, a urea, a thiourea, an imidazole and a carboxylic acid. Mixtures of these may also be used. In one or more embodiments, the hydrogen bond donor may be ethylene glycol. In one or more embodiments, the hydrogen bond acceptor may be selected from a carnitine or a salt thereof, a betaine or a salt thereof, choline chloride, ethylammonium chloride or salts with a chloride. Mixtures of these may also be used. In one or more embodiments, the hydrogen bond acceptor may be choline chloride. In one or more embodiments, a molar ratio of the hydrogen bond acceptor to hydrogen bond donor of the deep eutectic solvent may range from 1:1 to 1:3.

In one or more embodiments of the present disclosure, the process may include the addition of used Li-ion batteries, or portions thereof, which may contain electrode materials such as $LiCoO_2$, $LiMn_2O_4$, $LiFePO_4$, $LiNi_xCo_yAl_zO_2$, $LiNi_xMn_yCo_zO_2$ (where x, y, z are each a fraction between 0 and 1), to the DES. The DES including the one or more electrode materials may be further subjected to heating and/or agitation, such that the metal ions may be leached into the DES mixture. The leaching of metal ions in the DES may be observed as a color change occurs in the solvent solution. By using this solvation process, a mixture of cathodes comprised of multiple battery chemistries may be simultaneously dissolved in the same DES batch. After separating and filtering, components like the PVDF binder, aluminum foil substrate, and polymer separator from the battery cathode, and in other filler, the remaining leachate can be mixed with another compound to recover the metal for use in another product. Alternatively, the leachate may be directly electrodeposited onto another substrate. Recovery of anode materials from the Li-ion battery such as the copper and graphite is also possible.

In one or more embodiments, in the leaching and extracting of the metal ions from the battery waste product, the DES may be mixed with the battery waste product in a ratio ranging from 10 g/0.001 g to 1 g/0.1 g. In one or more embodiments, the DES may be mixed with the battery waste product in a ratio ranging from 10 g/0.001 g to 1 g/0.1 g, 5 g/0.001 g to 5 g/0.1 g, 5 g/0.01 g to 5 g/0.1 g, and 1 g/0.001 g to 1 g/0.1 g.

In one or more embodiments, the DES may be capable of extracting at least 50 wt % of the metal contained in the spent lithium ion battery waste product. In one or more embodiments, the DES may be capable of extracting at least 75 wt % of the metal contained in the spent lithium ion battery waste product. In other embodiments, the DES may be capable of extracting at least 90, 95, or 99 wt % of the metal contained in the spent lithium ion battery waste product.

In one or more embodiments, to increase the extraction efficiency, variations of the specific types of chemical solvents used for the dissolution process may include not only selecting from a wide number of different hydrogen bond donors and acceptors, but also specifically selecting the molar amounts thereof. Other dissolution and recovery parameter modifications such as additional mechanical methods, pH, temperature treatment, and time can also affect the final product.

In addition to chemical precipitation, one or more embodiments of the present disclosure are directed to other metal recovery methods including electrowinning, or electrodeposition. For example, in one or more embodiments of the present disclosure, techniques such as electrodeposition, can also be used to recover metal ions from the leachate. Albeit energy intensive, such procedures could allow the DES itself to be recycled, making it available for additional cycles of metal extraction. For example, in one or more embodiments, the process may also include recovering the deep eutectic solvent following the metal recovery step and recycling the deep eutectic solvent to the contacting step.

In one or more embodiments, chemical precipitation may include mixing the metal containing deep eutectic solvent with a carbonate/hydroxide rich solution comprising at least 15 wt % of an alkali metal carbonate or metal hydroxide. In one or more embodiments, the alkali metal carbonate may be sodium carbonate.

In one or more embodiments, the precipitate may be subjected to a drying and/or calcination step. For example, the precipitate may be dried at a temperature between 90° C. and 120° C. in air or vacuum. In one or more embodiments, the precipitate may be calcined at a temperature between 200° C. and 500° C. for 1 to 7 hours in air or in an inert atmosphere.

In one or more embodiments, the leaching and extracting of metals ions may be conducted at a temperature ranging from 25° C. to 220° C. In one or more embodiments, the leaching and extracting of metals ions may be conducted at a temperature ranging from 25, 50, 75, 100, 120, 140, and 150° C. to 75, 100, 120, 140, 160, 180, 200, and 220° C., where any lower limit may be combined with any mathematically feasible upper limit.

In one or more embodiments, the leaching and extracting may be conducted for an amount of time ranging from 8 to 72 hr. In one or more embodiments, the leaching and extracting may be conducted for an amount of time ranging from 8, 12, 16, 20, 24, 28, 32, 36, and 40 hr to 24, 32, 40, 48, 56, 64, and 72 hr, where any lower limit may be combined with any mathematically feasible upper limit.

In one or more embodiments, the leaching and extracting may be conducted at a pressure ranging from 10 kPa to 10 MPa.

EXAMPLES

The following examples are merely illustrative and should not be interpreted as limiting the scope of the present disclosure.

To demonstrate the efficacy of the described process, lithium cobalt (III) oxide (LCO) was employed herein as an initial model compound as an example of repurposing the cobalt used in LIBs. A DES composed of choline chloride and ethylene glycol (ChCl:EG) was used to extract metal ions from LCO, which were then precipitated and converted into $Co_3O_4$, a common precursor for the synthesis of $LiCoO_2$. Both precursors used to prepare the deep eutectic solvent are biodegradable, making the proposed process more environmentally friendly than existing alternatives.

Preparation of DES

In the following examples the DES was formed at room temperature by combining choline chloride ($HOC_2H_4N[CH_3]3Cl$, ≥98%, purchased from Sigma-Aldrich) and ethylene glycol ($HOCH_2CH_2OH$, anhydrous, 99.8%, purchased from Sigma-Aldrich) in a 1:2 molar ratio. However, a molar ratio of the hydrogen bond acceptor to hydrogen bond donor of the deep eutectic solvent may range from 1:1 to 1:3. The components may be constantly stirred until a clear, homogenous solution is obtained. For the metal extraction experiments further detailed below, 0.1 g of lithium cobalt (III) oxide powder ($LiCoO_2$, LCO, 99.8%, purchased from Sigma-Aldrich) was added to 5 g of DES and mixed in a closed glass vial.

Preparation of Test LCO/Li Half-Cells

In additional experiments, LCO/Li half-cells were prepared using cathode slurries composed of 80% LCO (99.8% purity, purchased from Sigma-Aldrich), 10% carbon black super P conductive (≥99%, purchased from Alfa Aesar), and 10% polyvinylidene fluoride (PVDF) binder dissolved in N-methyl-pyrrolidinone (anhydrous, 99.5%, purchased from Sigma-Aldrich). The slurry was homogenized in a Thinky planetary mixer, employing three successive mixing/resting loops (4 minutes at 1500 rpm, and then 3 minutes rest). The slurry was then transferred to a cleaned aluminum foil and rolled into a 120 μm film (wet thickness) using a TQC applicator. The electrode was laid flat to dry and subsequently left overnight in a vacuum oven at 90° C. The dried sheet was pressed at 90° C. in an MTI HR01 Hot Rolling Machine down to an average thickness of 12.2 μm (25.7 μm including the aluminum foil). Punched discs (16 mm dia.) were used for cell assembly. The LCO/Li coin-cells were constructed in an Argon-filled glovebox (MBraun Unilab), using lithium chips from Alfa Aesar (0.7 mm thick). Cells were potentiostatically charged and discharged for 300 cycles at a 1C rate, using 3.4 V and 4.2 V as cut-offs on a Lanhe cycler. After the final discharge, the spent batteries were dismantled, and the entire harvested LCO electrode was immersed into the DES at 180° C. for 24 hours without any further processing.

Metal Extraction Experiments

Experiment 1: Leaching Efficiency at Different Temperatures

In the below examples the temperature dependency of the leaching efficiency was evaluated by placing individual sample vials into an oil bath for 24 hours where average bath temperatures ranged from 25° C. to 220° C. (±10° C., limited by the heating element in the hot plate).

Figure 2:
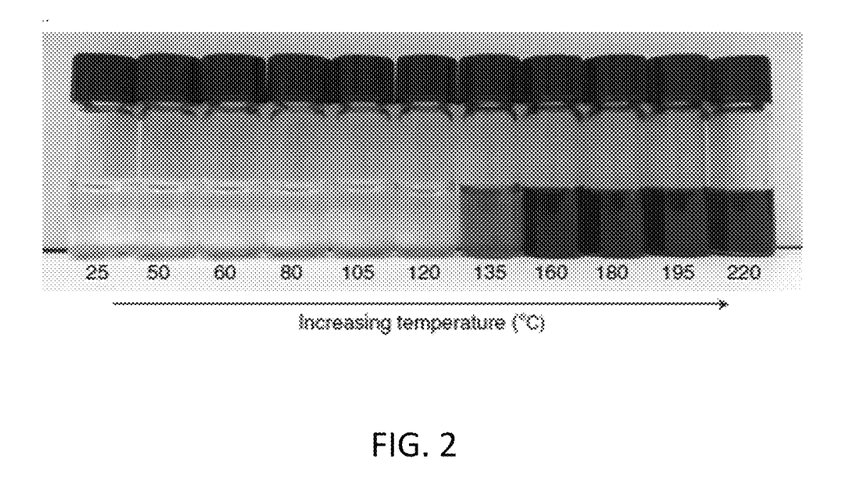
FIG. 2 shows qualitative results from when lithium cobalt (III) oxide is dissolved in the DES at different temperatures.

By way of example, 100 mg of LCO powder was added to 5 g of the ChCl:EG deep eutectic solvent. A series of these LCO-DES mixtures were subjected to a range of temperatures from 25° C. to 220° C. for 24 h. The dissolution of cobalt was found to be highly dependent on the temperature in which the extraction took place. At increasingly elevated temperatures, the clear eutectic transformed into darker hues of blue, as shown in FIG. 2.

Figure 3A:
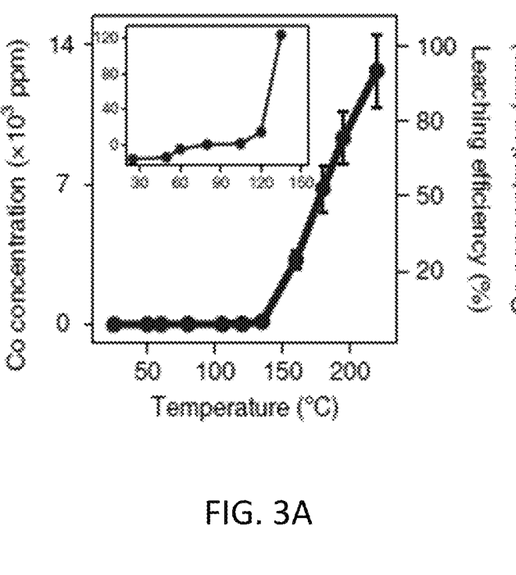

The demonstrated color variation is qualitatively indicative of different cobalt extraction efficiencies at different temperatures. Very slight blue-green coloration was seen at temperatures as low as 80° C., coinciding with the first detectable amount of cobalt registered by the inductively coupled plasma optical emission spectrometer as demonstrated in the ICP-OES results in FIG. 3A and Table 1, provided below. Until 120° C., only nominal increases in cobalt concentration may be perceived, as seen in the inset of FIG. 3A. At 135° C., however, there was an observable discontinuity in the shading of color, going from a pale blue-green to a vibrant emerald green that coincided with an increase in total Co concentration by nearly an order of magnitude.

As can be seen from the nonlinear right axis of FIG. 3A, cobalt leaching efficiencies of up to 94.1% were reached at the highest temperature tested (Table 1). Leaching efficiencies as high as 99.3% could also be obtained by reducing the initial amount of LCO powder used in the experiments (from 100 mg to 13 mg), which rivals the leaching efficiencies of typical hydrometallurgical reagents such as phosphoric and concentrated hydrochloric acid that report efficiencies of 97.8% and 100%, respectively.

TABLE 1

The effect of temperature on cobalt and lithium extraction by a deep eutectic solvent.

| Extracted Element | Temperature (° C.) | Average Concentration (ppm) | Standard Deviation | Leaching Efficiency (%) |
| --- | --- | --- | --- | --- |
| Cobalt | 25 | 0 | 0.24 | 0 |
| | 50 | 0 | 0.93 | 0 |
| | 60 | 0 | 2.89 | 0 |
| | 80 | 0.40 | 2.48 | 0 |
| | 105 | 1.42 | 8.96 | 0.01 |
| | 120 | 14.67 | 4.41 | 0.11 |
| | 135 | 123.72 | 93.51 | 0.92 |
| | 160 | 3211.86 | 491.71 | 23.80 |

TABLE 1-continued

The effect of temperature on cobalt and lithium extraction by a deep eutectic solvent.

| Extracted Element | Temperature (° C.) | Average Concentration (ppm) | Standard Deviation | Leaching Efficiency (%) |
|---|---|---|---|---|
|  | 180 | 6788.85 | 1150.28 | 50.30 |
|  | 195 | 9332.02 | 1346.96 | 69.14 |
|  | 220 | 12706.39 | 1800.69 | 94.14 |
| Lithium | 25 | 3.28 | 2.91 | 0.21 |
|  | 50 | 3.14 | 2.67 | 0.20 |
|  | 60 | 4.35 | 1.58 | 0.27 |
|  | 80 | 2.65 | 1.03 | 0.17 |
|  | 105 | 11.31 | 0.14 | 0.71 |
|  | 120 | 5.91 | 3.46 | 0.37 |
|  | 135 | 44.63 | 16.22 | 2.81 |
|  | 160 | 451.72 | 144.55 | 28.44 |
|  | 180 | 1426.42 | 912.55 | 89.81 |

The resulting concentrations and respective leaching efficiencies are based on the combination of 0.1 g LCO with 5 g ChCl:EG, heated for 24 hours. Averages and standard deviations based on at least three replicates at each temperature; error bars in the FIG. 3A reflect these +/− standard deviations.

Figure 4:
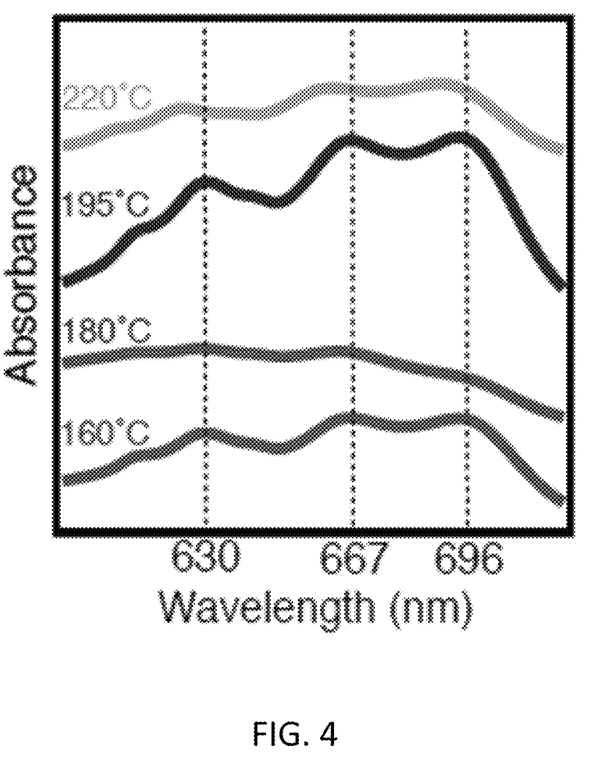
FIG. 4 shows a UV-vis spectra of $LiCoO_2$ in deep eutectic solvent filtrates from different temperature treatments.

FIG. 4 shows results from UV-vis spectroscopy analysis of the liquids after removing unreacted LCO particles. The results show the signature bands of the tetrachlorocobaltate (II) anion ($[CoCl_4]^{2-}$), with three distinct bands between 600 and 700 nm (FIG. 4). The presence of cobalt (II) chloride complex $[CoCl_4]^{2-}$ is indicated by the three signature bands shifting slightly right from 630, 667, and 696 nm. At 220° C., the filtrate's spectra exhibit shifts in the band positions by 5 nm, suggesting the existence of different cobalt halide complexes. For extraction temperatures between 160° C. and 195° C., the triplet falls into the same approximate wavenumbers; a systematic blue shift observed after thermal treatment at 220° C. can be indicative of solvation effects due to the formation of additional complexes. The tetrachlorocobaltate (II) anion has a characteristic blue color and is responsible for the tonality of the samples exposed to different temperatures.

In fact, Co(II) exists in $[CoCl_4]^{2-}$, while Co(III) occurs in the oxide. Ethylene glycol, which is present in the eutectic as the hydrogen bond donor, is a common reducing agent used in the synthesis of metallic nanoparticles. It may be possible that the dissolution of $LiCoO_2$ in the ChCl:EG DES involves the simultaneous oxidation of ethylene glycol and reduction of cobalt. It is theorized that the presence of an oxygen acceptor in the eutectic appears to be essential to digest oxides, as it facilitates the cleavage of metal-oxide bonds. Ethylene glycol can be chemically acting as such an acceptor, being oxidized (and reducing cobalt) in the process. Note that typical routes for the dissolution of oxides by eutectics implies partial alterations on the chemical makeup of the solvent. Yet even when such transformations are not fully reversible during recovery (by precipitation or electrodeposition, for example), the eutectic may still be functional: partially oxidized compounds may still accept additional oxygen, while fully-oxidized alcohols would provide protons, believed to be effective oxygen acceptors. Accordingly, the recycled DES can actually leach cobalt with efficiencies close to that of the fresh solvent, as will be discussed later.

Experiment 2: Leaching Efficiency Over Time

In separate examples, the effect of time on metal extraction was assessed by maintaining the mixtures for 48 and 72 hours at different average temperatures (25° C., 50° C., and 105° C.). After each thermal treatment, the LCO+DES leachate was poured into a funnel lined with a hydrophilic polyvinylidene Durapore membrane filter (90 mm diameter, 0.45 μm pore size, purchased from MilliporeSigma), and the resulting filtrate was used for characterization and subsequent recovery. The leaching efficiency of the process was determined as described below:

Leaching efficiency (η) is defined as:

$$\eta = (CV/mx) \times 100\% \quad (1)$$

where C=final concentration of the metal measured in mg/L, V=volume of initial leaching solution in L, and mx=mass of the initial amount of x (Li+ or Co3+, for example) in the active material, measured in mg.

Figure 3B:
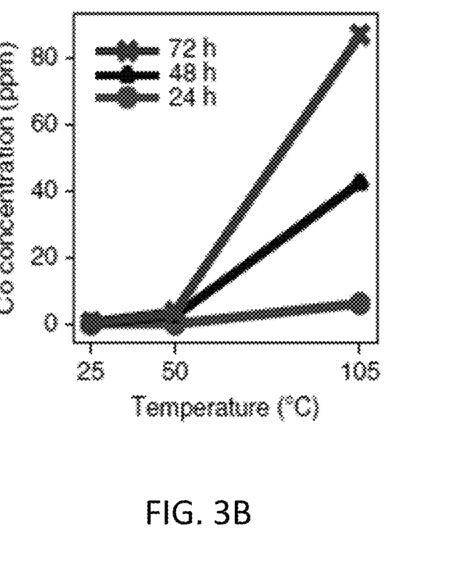
FIG. 3B shows the cobalt concentration versus temperature for three different durations of dissolution and further demonstrate the time dependency of cobalt leaching.

Time was also investigated as a variable. The cobalt extraction using DES, prepared in accordance with one or more embodiments, was tested at three different temperatures (25° C., 50° C., and 105° C.) for 24, 48, and 72 hours. Results shown in FIG. 3B indicate the significant effect that duration of heat exposure had on dissolution of cobalt. Dissolved-metal concentrations more than double from 24 hours to 48 hours, and at higher treatment temperatures, extending the thermal treatment from 24 hours to 72 hours increased extraction levels by more than an order of magnitude. Hence, higher cobalt leaching efficiencies are also obtainable at greater exposure times Table 2.

TABLE 2

The effect of time on cobalt extraction by a deep eutectic solvent.

| Time (h) | Temperature (° C.) | Avg. Co Concentration (ppm) | Standard Deviation | Leaching Efficiency (%) |
|---|---|---|---|---|
| 24 | 25 | 0 | 0.24 | 0 |
|  | 50 | 0 | 0.93 | 0 |
|  | 105 | 6.15 | 1.33 | 0.05 |
| 48 | 25 | 0 | 0.33 | 0 |
|  | 50 | 2.47 | 0.19 | 0.02 |
|  | 105 | 42.32 | 0.39 | 0.31 |
| 72 | 25 | 0.46 | 0.07 | 0 |
|  | 50 | 3.62 | 0.08 | 0.03 |
|  | 105 | 86.84 | 1.36 | 0.64 |

Recovery Strategies

Experiment 3: Precipitation

In one or more embodiments, the dissolved cobalt contained in the filtrate may be recovered by precipitation in a carbonate-rich solution. For example, to demonstrate the carbonate-rich solution, 4 mL of the filtrate was diluted in 10 mL of a 20 wt % aqueous solution of $Na_2CO_3$. Upon mixing, the blue filtrate was demonstrated to experience a change in color wherein the solution may become brown, after which the sample may centrifuged at 12000 rpm for 30 minutes. The formed precipitate may then be transferred to a Durapore membrane filter and rinsed with deionized water until the collected liquid no longer appeared cloudy upon the addition of an $AgNO_3$ solution (indicating the removal of ChCl's chloride from the solid). The cleaned precipitate powder may then be dried in an oven at 90° C. and then calcined at 500° C. for 6 hours, in accordance with one or more embodiments disclosed herein.

A full recycling scheme (FIG. 1), in accordance with one or more embodiments of the present disclosure, requires the recovery and repurposing of the metal ions. Given the fact that $H_2O$ is typically a stronger ligand than chloride, Co(II) exists in solution, and $CoCO_3$ has an extremely low solubility product in water, precipitation was attempted by diluting the blue leachates with $Na_2CO_3$(aq) ($CoCO_3$ could be useful to the creation of new LIBs). It is typically difficult to obtain crystalline cobalt carbonates by precipitation. Additionally, as $Na_2CO_3$ is basic and the blue solutions have a high cobalt content, precipitation of $Co(OH)_2$ is also likely.

Figure 5:
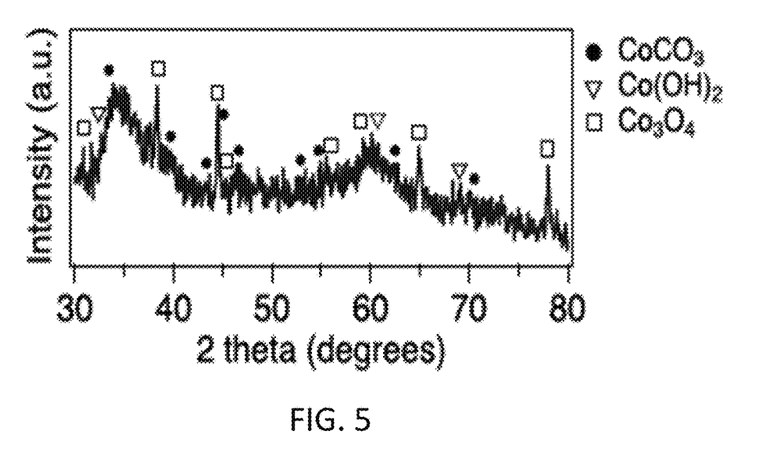
FIG. 5 shows an XRD of precipitated compounds from the $LiCoO_2$ in deep eutectic solvent leachate shows the presence of carbonate and oxide.
Figure 6A:
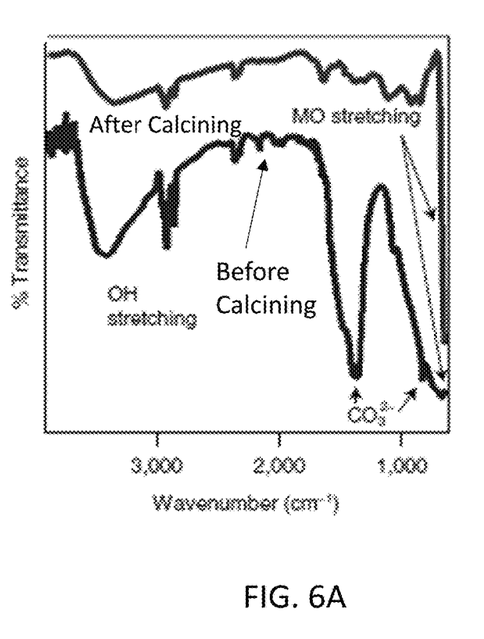

The precipitation experiments resulted in a light-brown powder, containing essentially amorphous materials as shown in FIG. 5, that may possibly be a mixture of $CoCO_3$, $Co(OH)_2$ and $Co_3O_4$. The observation of faint diffraction peaks of the latter suggests the existence of Co(III) in the leachate. The Fourier transform infrared (FTIR) spectrum of the recovered powder (FIG. 6A, blue curve) shows intense bands at 660, 1380, and around 3400 $cm^{-1}$, respectively indicative of stretching modes from octahedrally and tetrahedrally coordinated $Co^{3+}$ and $Co^{2+}$ metal oxide ions corresponding with spinel $Co_3O_4$, carbonate formation (that also has a small band at 832 cm−1), and OH stretching which arise from hydroxides and residual water in the sample. X-ray photoelectron spectroscopy (XPS) provides yet additional compositional evidence for the precipitated product.

Figure 7A:
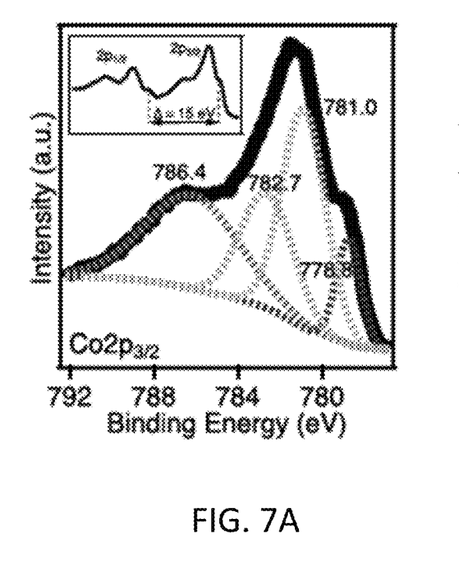
Figure 7B:
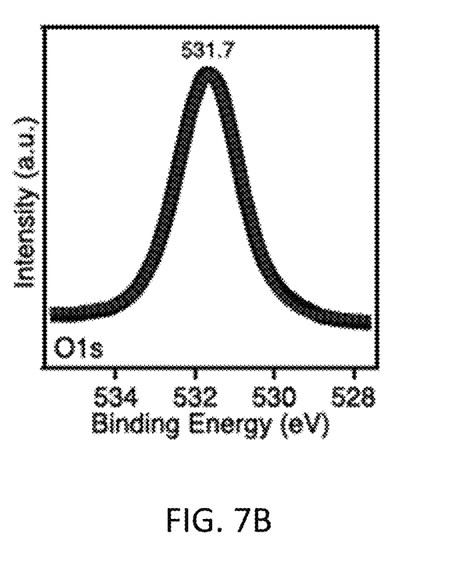
FIG. 7B shows an O 1s XPS with a peak at 531.7 eV, which indicates $CO_3^{2-}$, suggesting that basic cobaltous carbonate was precipitated.

The XPS spectrum in FIG. 7A suggest that $Co(OH)_2$ was present due to peaks at 781.0, 782.7, and 786.4 eV, as well as possible trace amounts of cobalt metal which may be the cause of the smallest peak at 778.8 eV (FIG. 7A). The inset therein is consistent with the 15 eV difference in binding energy (spin-orbit coupling) between the 2p1/2 and the 2p3/2 peaks of pure cobalt metal. In the O 1s band (FIG. 7B), a peak at 531.7 eV was observed and is likely due to the presence of carbonates.

Experiment 4: Calcination

To further create a more useful compound for synthetic purposes, the recovered powder may also be subjected to calcination, in accordance with one or more embodiments of the present disclosure.

Figure 6B:
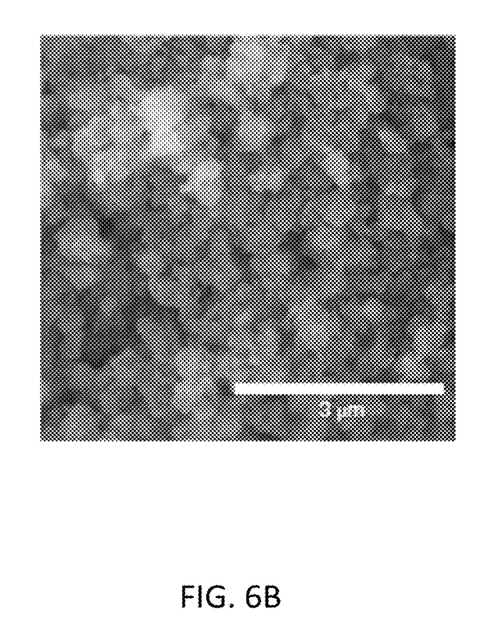
FIG. 6B is a scanning electron microscopy image of the calcined powder, showing a uniformly spherical microstructure.
Figure 8A:
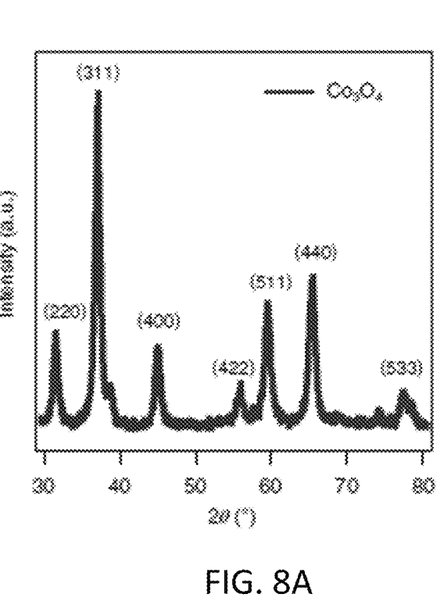
Figure 8B:
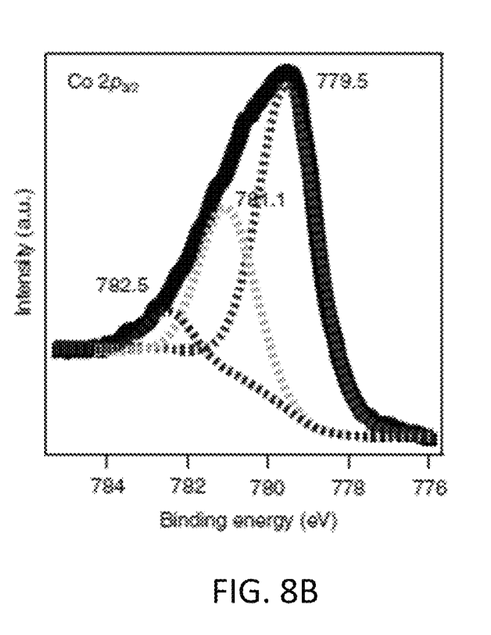
FIG. 8B shows XPS spectra of the calcined powder, showing fitted peaks indicative of the binding energies of $Co_3O_4$.
Figure 9A:
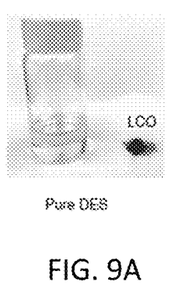
Figure 9B:
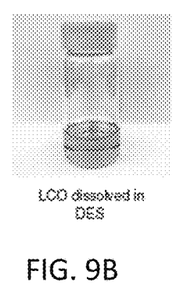
Figure 9C:
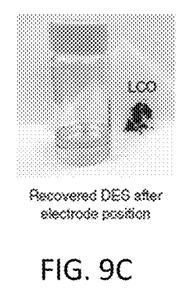
Figure 9D:
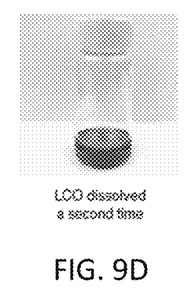

Calcination of the recovered powder described in Experiment 3 was conducted at 500° C. for 6 hours, which appeared to convert most (if not all) components into uniformly spherical particles (FIG. 6B). The XRD pattern of the calcined powder (FIG. 8A) aligns well with that of $Co_3O_4$ (JCPDS 42-1467, cubic). FIG. 8B shows the XPS curve fitting of Co 2p3/2 band with peaks at 779.5, 781.1, and 782.5, which also correspond to the binding energies of Co3O4. This change from "hydrated cobaltous carbonate" to $Co_3O_4$ powder was also clear from the disappearance of the $CO_3^{2-}$ FTIR band (FIG. 6A), and can qualitatively be seen as the precipitate darkened from light brown to black after oxidizing. Conservative mass calculations of the predicted species before and after calcining indicated that about 74% of the cobalt from the DES leachate could be recovered in the form of $Co_3O_4$.

Example 5: Electrodeposition of Metal Ions

As previously described above, in one or more embodiments of the present disclosure, alternative methods, such as electrodeposition, can also be used to recover metal ions from the leachate. A proof of concept of this approach is demonstrated in FIG. 9. Experiments using the LCO-DES mixture treated at 135° C. resulted in the electrodeposition of $Co(OH)_2$ onto a stainless steel mesh working electrode.

As presently demonstrated, electrodeposition examples employed the use of a 3-electrode setup, containing Ag/AgCl as the reference electrode, and stainless steel mesh as both working and counter electrodes. A DES sample was used to digested LCO at 135° C. and was exposed to a constant current set at −4.5 mA for 1 hour.

XPS analysis of the deposits formed at the working electrode suggests that cobalt was recovered as $Co(OH)_2$. In this preliminary test, only a fraction of the dissolved cobalt was plated. The remainder seemed to assemble into a dark brown gel-like phase, which separated from a liquid phase of almost-clear coloration. The liquid phase was extracted after centrifugation (12000 rpm for 30 min) and reutilized in leaching studies. The resulting DES turned bluish-green again (FIG. 9D) and a concentration of 180.96 ppm was obtained after treatment at 135° C., which is comparable to the Co concentration leached into the original DES, indicating that the eutectic can be fully functional for at least another cycle.

The liquid phase after this treatment presented a very pale color, almost as clear as in the pristine DES. After a new addition of LCO and exposure of the mixture to 135° C., vibrant green hues were once again visible, which is a visual indication of cobalt leaching. The resulting leaching efficiency approached that of the pristine DES, indicating that the eutectic can potentially maintain its performance over multiple cycles.

Experiment 6:

To verify the feasibility of using DES extraction in an actual battery electrode, Experiment 6 was extended to observe the behavior towards other parts of a Li-ion battery.

Different battery components were exposed to the DES at various temperatures and it was generally observed that no reaction occurred when mixing between room temperature and 105° C., with the exception of copper foil. LCO/Li half-cells were assembled and tested for 300 charge/discharge cycles, as described above. The batteries were then dismantled, and the harvested cathodes were immersed into the ChCl:EG DES at 180° C. without any further processing. The electrode coating was observed to easily detach from the current collector.

Figure 11A:
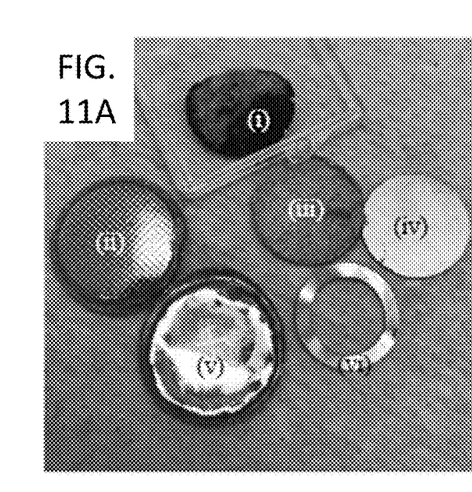
Figure 11B:
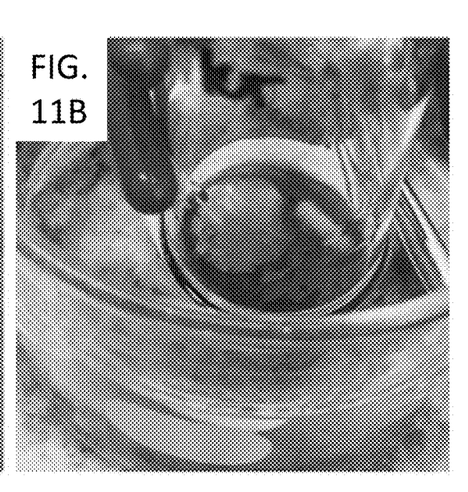
FIG. 11B shows a photograph of the immediate color change upon placing Li-ion battery cathode in deep eutectic solvent's immersion into an oil bath at 180° C.

DESs have been investigated for their plasticizing abilities for polymers, and it is thought that the adhesion between the cathode material and aluminum foil is weakened as the inter-chain interactions diminish, aided by heat and mechanical agitation during the stirring. Hence, the cathode powder was separated from the aluminum foil easily and bluish hues were immediately observed in the liquid phase, indicating prompt cobalt extraction (FIG. 11). The foil was pulled out, and the PVDF binder and conductive carbon (along with eventual unreacted LCO particles) were able to be filtered out of the solution. The cobalt leaching efficiency for this process was found to be 29.6% (the LCO:DES weight ratio was 0.1 g:5 g).

Experiment 7: NMC Battery Examples

Figure 12A:
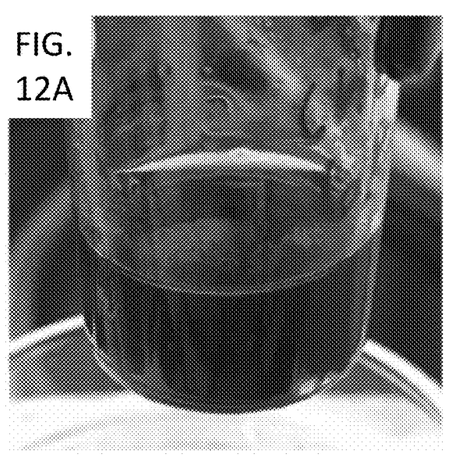

Experiment 7 was conducted to study the behavior of the ChCl:EG DES in contact with the increasingly popular NMC battery chemistry. Similar to observations with LCO, immersion of NMC powder to the fixed amount of eutectic at 180° C. caused immediate color change to dark green, as shown in FIG. 12A. Dissolution of all metal ions in the DES were observed and quantified using ICP-OES but as lithium and cobalt are of primary interest, these will be the ones reported here due to the growing demand for these resources.

Figure 10:
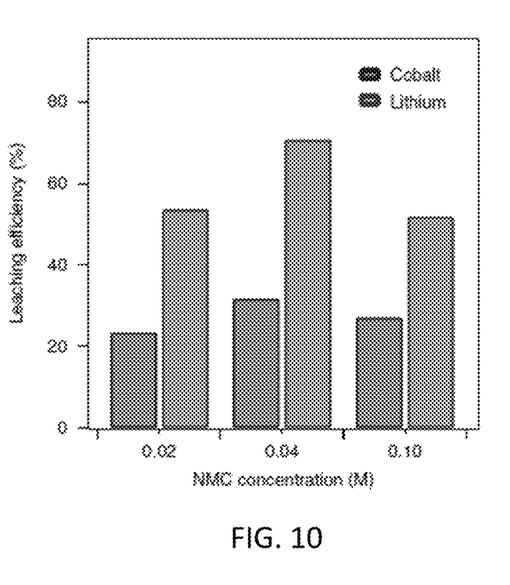
FIG. 10 shows a bar graph of the leaching efficiency of NMC powder dissolved in the DES at 180° C.
Figure 12B:
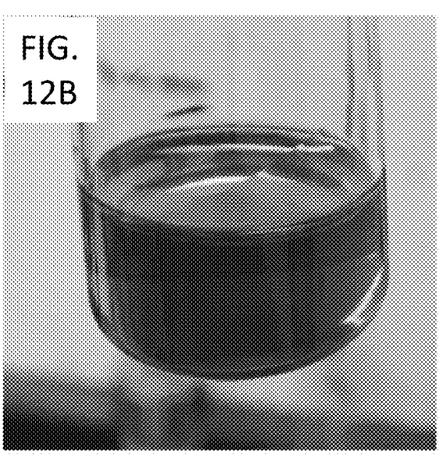

The remaining metals are reported in Table 3. Leaching efficiencies as high as 71% for lithium and 32% for cobalt were obtained by varying the initial cathode powder added to 5 g of DES (FIG. 10). Interestingly, the leachate underwent additional color change upon cooling down to room temperature (FIG. 12B), indicating the existence of multiple dissolved complexes. The existence of such complexes may explain the non-monotonic dependence between leaching and initial NMC content, as different species may be favored at varying conditions. It may also justify the lower efficiencies for cobalt extraction in NMC (vs. in LCO), as at a given NMC/DES ratio, the different metal ions compete for a limited number of binding sites. The dissolution of both lithium and cobalt was demonstrated at a ratio of NMC:DES that ranged from 10 mg:5 g to 45 mg:5 g. The dissolution of both lithium and cobalt favored a ratio of 20 mg of NMC powder to 5 g of DES, while the other metals behaved differently (Table 3).

TABLE 3

Metal extraction from $LiNi_1/3Mn_1/3Co_1/3O_2$ (NMC) using ChCl:EG, based on the combination of varying amounts of NMC powder initially added to a fixed 5 g ChCl:EG and heated for 24 hours at 180° C.

| Extracted Element | Initial added NMC powder (mg) | Average Concentration (ppm) | Standard Deviation | Leaching Efficiency (%) |
|---|---|---|---|---|
| Lithium | 10 (0.02M) | 86.54 | 1.29 | 53.69 |
| | 20 (0.04M) | 228.22 | 17.94 | 70.80 |
| | 45 (0.1M) | 376.27 | 27.52 | 51.88 |
| Cobalt | 10 (0.02M) | 320.39 | 1.46 | 23.41 |
| | 20 (0.04M) | 867.94 | 3.76 | 31.71 |
| | 45 (0.1M) | 1667.24 | 3.67 | 27.07 |
| Nickel | 10 (0.02M) | 257.03 | 48.57 | 18.86 |
| | 20 (0.04M) | 181.42 | 29.05 | 6.65 |
| | 45 (0.1M) | 601.77 | 102.04 | 9.81 |
| Manganese | 10 (0.02M) | 522.92 | 263.37 | 40.99 |
| | 20 (0.04M) | 1535.12 | N/A | 60.16 |
| | 45 (0.1M) | N/A | N/A | N/A |

As the metal oxides become more complex (by having multiple transition metal ions), the separation processes required to recover individual species also become more intricate. Other recovery possibilities may include using electrowinning techniques that can selectively deposit the specific metals, one at a time. In one or more embodiments, the above-discussed techniques may be suitably applied to DESs, enabling the reutilization of the many elements composing the cathode materials.

Herein it is demonstrated that a DES made of choline chloride and ethylene glycol can extract metals from LIB cathode materials, attaining leaching efficiencies as high as 99.3%. Time and temperature played an important role in dictating the effectivity of the metal extraction, with oxide dissolution being favored by longer and warmer experiments.

In addition to reporting the dissolution of $LiCoO_2$ and $LiNi_1/3Mn_1/3Co_1/3O_2$ in a DES, it was demonstrated that the metals could be recovered as synthetically useful products, by precipitating dissolved ions and calcining the obtained compounds. Further, it was shown that when dilution of the DES is avoided (by recovering cobalt by electrodeposition), the residual eutectic can be once more employed to leach metals from LCO, with no apparent loss in efficiency.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A process for extracting, recovering and recycling metals and materials from spent lithium ion batteries (LIB) comprising the steps of:

contacting spent lithium ion battery waste product comprising metals and/or metal alloys with a deep eutectic solvent, wherein the deep eutectic solvent comprises a hydrogen bond acceptor compound and a hydrogen bond donor compound;

leaching the metal from the battery waste product and extracting the metal into the deep eutectic solvent with heat and agitation;

recovering dissolved metals ions from the deep eutectic solvent; and regenerating cathode materials from the dissolved metal ions.

2. The process of claim 1, wherein the leaching and extracting is conducted at a temperature ranging from 25° C. to 220° C.

3. The process of claim 1, wherein the leaching and extracting is conducted for 8 to 72 hr.

4. The process of claim 1, wherein the leaching and extracting is conducted with temperature ranging between 120° C. to 220° C. and pressure between 10 kPA to 10 MPa for 12 to 24 hours.

5. The process of claim 1, wherein a molar ratio of the hydrogen bond acceptor to hydrogen bond donor of the deep eutectic solvent ranges from 1:1 to 1:3.

6. The process of claim 1, wherein the hydrogen bond donor is selected from an alcohol, an amine, a urea, a thiourea, an imidazole and a carboxylic acid.

7. The process of claim 6, wherein the hydrogen bond acceptor is selected from a carnitine or a salt thereof, a betaine or a salt thereof, choline chloride, ethylammonium chloride, or other chloride salt.

8. The process of claim 7, wherein the hydrogen bond donor is ethylene glycol and wherein the hydrogen bond acceptor choline chloride.

9. The process of claim 1, wherein the deep eutectic solvent is capable of extracting at least 50 wt % of the metal contained in the spent lithium ion battery waste product.

10. The process of claim 1, wherein recovering the dissolved metal ions comprises precipitating the dissolved metal ions.

11. The process of claim 10, wherein the chemical precipitation includes mixing the metal containing deep eutectic solvent with a carbonate or hydroxide rich solution comprising at least 15 wt % of an alkali metal carbonate or metal hydroxide.

12. The process of claim 1, further comprising recovering the deep eutectic solvent following the metal recovery step and recycling the deep eutectic solvent to the contacting step.

13. The process of claim 1, wherein the regeneration of the cathode materials is achieved via addition of metal hydroxides directly to the deep eutectic solvent.

14. A process for extracting, recovering and recycling metals and materials from spent lithium ion batteries (LIB) comprising the steps of:

contacting spent lithium ion battery waste product comprising metals and/or metal alloys with a deep eutectic solvent, wherein the deep eutectic solvent (DES) comprises choline chloride and ethylene glycol in a molar ratio ranging from 1:1 to 1:3, wherein the DES is mixed with the battery waste product in a ratio ranging from 5 g/0.001 g to 5 g/0.1 g;

leaching the metal from the battery waste product and extracting the metal into the deep eutectic solvent, wherein the leaching and extracting is conducted for 8 to 72 hr at a temperature ranging from 25° C. to 220° C.;

recovering the dissolved metals ions from the deep eutectic solvent; and regenerating cathode materials from the dissolved metal ions.

* * * * *